United States Patent [19]

Skotheim

[11] Patent Number: 4,471,036

[45] Date of Patent: Sep. 11, 1984

[54] ELECTROCHEMICAL PHOTOVOLTAIC CELLS AND ELECTRODES

[75] Inventor: Terje A. Skotheim, East Patchogue, N.Y.

[73] Assignee: The United States of America as represented by the United States Department of Energy, Washington, D.C.

[21] Appl. No.: 509,076

[22] Filed: Jun. 29, 1983

[51] Int. Cl.³ .................. H01M 6/36; C25D 9/02; C25D 13/08

[52] U.S. Cl. .................................. 429/111; 204/15; 204/78; 204/79; 204/181 R; 204/290 R

[58] Field of Search ............................ 204/15, 78–79, 204/181 R, 290 R; 429/111; 136/258 AM, 263

[56] References Cited

U.S. PATENT DOCUMENTS

| Re. 30,383 | 8/1980 | Kaplow et al. | 136/249 MS |
|---|---|---|---|
| 3,410,773 | 11/1968 | Hagan et al. | 204/181 |
| 4,199,377 | 4/1980 | Corwin et al. | 136/255 |
| 4,200,473 | 4/1980 | Carlson | 136/255 |
| 4,214,916 | 7/1980 | Felsher et al. | 136/255 |
| 4,217,148 | 8/1980 | Carlson | 136/255 |
| 4,219,830 | 8/1980 | Gibbons | 357/30 |
| 4,238,436 | 12/1980 | Hill et al. | 264/81 |
| 4,251,286 | 2/1981 | Barnett | 136/260 |
| 4,251,289 | 2/1981 | Moustakas et al. | 136/255 |
| 4,253,882 | 3/1981 | Dalal | 136/249 TJ |
| 4,266,984 | 5/1981 | Wronski et al. | 136/255 |
| 4,289,602 | 9/1981 | Sansregret | 204/325 |

OTHER PUBLICATIONS

R. Noufi et al., "Enhanced Stability of Photoelectrodes With Electro-generated Polyaniline Films", *J. Electrochem. Soc.*, vol. 129, pp. 2261–2265, (1982).

S. N. Chen et al., "Polyacetylene, $(CH)_x$: Photoelectrochemical Solar Cell", *Appl. Phys. Lett.*, vol. 36, pp. 96–98, (1980).

G. Calabrese et al., *J. Am. Chem. Soc.*, vol. 104, pp. 2412–2417, (1982).

L. Fornarini et al., *J. Electrochem. Soc.*, vol. 130, pp. 2184–2187, Nov., (1983).

J. E. Dubois et al., *J. Electroanal. Chem.*, vol. 117, pp. 233–241, (1981).

A. Volkov et al., *J. Electroanal. Chem.*, vol. 115, pp. 279–291, (1980).

G. Mengoli et al., *J. Electrochem. Soc.*, vol. 128, pp. 2276–2281, (1981).

J. E. Dubois et al., *Thin Solid Films*, vol. 69, pp. 141–148, (1980).

H. S. White et al., *J. Electrochem. Soc.*, vol. 129, pp. 265–271, (1982).

*Primary Examiner*—Aaron Weisstuch
*Attorney, Agent, or Firm*—Vale P. Myles; James W. Weinberger; Michael F. Esposito

[57] ABSTRACT

Improved electrochemical photovoltaic cells and electrodes for use therein, particularly electrodes employing amorphous silicon or polyacetylene coating are produced by a process which includes filling pinholes or porous openings in the coatings by electrochemical oxidation of selected monomers to deposit insulating polymer in the openings.

18 Claims, No Drawings

ELECTROCHEMICAL PHOTOVOLTAIC CELLS AND ELECTRODES

BACKGROUND OF THE INVENTION

The United States Government has rights to this invention pursuant to Contract No. DE-AC02-76-CH00016 between the United States Department of Energy and Associated Universities, Inc.

Photovoltaic cells in which one electrode is coated with a material which is a semiconductor when exposed to light and an insulator in the dark, and the counterelectrode is transparent, are well known. Typically useful coatings include amorphous silicon (a—Si) and polyacetylene (PA). Procedures for forming films of these materials on conductive substrates are well known.

A persistent problem in making efficient large area a—Si electrodes and photovoltaic cells, in particular photoelectrochemical cells, has been the difficulty of eliminating pinholes which may allow direct contact between the front (e.g. electrolytic) and back (ohmic) electrodes, thereby electrically shorting the cell and severely diminishing the photovoltage and photocurrent.

In photoelectrochemical solar cells such as described by Chen et al in *Appl. Phys. Lett.*, Vol 36, No. 1 January 1980 at pages 96 through 98, PA films formed on conductive metallic substrates are fibrilar or porous in nature. The electrodes are protected against shorting out by filling the pores with wax. The output of the cells is limited by the small functional area of the wax impregnated electrode which is in contact with the electrolyte.

It is known to deposit thin insulating polymer films on metallic substrates by electrochemical oxidation of selected monomers. Typically, these films are produced from monomeric phenols and amines, particularly monocarbocyclic, aromatic phenols and amines such as 2,6-xylenol; 3,5-xylenol; o-hydroxybenzyl alcohol; m-hydroxybenzyl alcohol; o-hydroxyphenyl acetic acid; o-allylphenol; tyramine; N(o-hydroxybenzyl) aniline; p-toluidine; p-anisidine; p-aminobenzoic acid; 2-aminobenzotrifluoride; 3-aminobenzotrifluoride; p-phenylendiamene, or o-phenylenediamine.

Useful procedures for depositing such films are described in:

1. Dubois et al, *J. Electroanal. Chem.*, 17 (1981) 233–241.
2. Volkov et al, *J. Electroanal. Chem.* 115 (1980) 279.
3. Mengoli et al, *J. Electrochem. Soc.: Electrochemical Science and Technology*, 128, No. 11 (November 1981) 2276–2281.
4. Dubois et al, *Thin Solid Films*, 69(1980) 141–148.

The procedures described in these articles are applicable to this invention except, as will be described in more detail hereinafter, they are carried out in the dark.

SUMMARY OF THE INVENTION

The methods of this invention utilize the procedures of the above identified articles to form insulating polymers in the pinholes and pores of coatings such as a—Si or PA coatings on conductive substrates in the production of electrodes for use in photovoltaic cells. For convenience the process will be called passivation, and the products produced may be described as passivated.

A typical electrode within the scope of this invention will be characterized by an electroconductive substrate and a coating which is a semiconductor when exposed to light and an insulator in the dark. The coating is passivated by an insulating polymer which has been deposited by electrochemical oxidation in the dark.

The polymers may be formed from monomers such as described above.

The electrodes are useful for the preparation of photovoltaic cells by known procedures to produce, for example, cells in which one electrode is an electrode of the invention and the transparent counterelectrode is, for example, indium tin oxide. In fact, the novel electrodes of this invention may be used to produce photovoltaic cells by any of the procedures heretofore employed to produce ordinary photovoltaic cells not manifesting the improved photovoltage and photocurrent of the cells of this invention.

The electroconductive substrate used in the production of the electrodes of the invention may be any of those metallic substrates generally employed for such purposes. These include the noble metals, particularly platinum and palladium, or other metals such as iron or titanium, and oxides thereof. Stainless steel is especially preferred because it is relatively inexpensive and efficient.

DETAILED DESCRIPTION OF THE PREFERRED EMBODIMENTS

A typical electrode based on a—Si might comprise a stainless steel substrate, a heavily doped (n+) a—Si layer and a passivated intrinsic (i) a—Si layer. Such an electrode when placed in a closed circuit with a transparent counterelectrode and an electrolyte such as an aqueous inorganic salt solution containing an alkali metal salt such as sodium or potassium iodide, sulfite, or sulfate will constitute a photovoltaic cell.

To produce a passivated electrode of the invention, a cell is set up with an ordinary a—Si or PA coated electrode as one electrode and a platinum electrode as the counterelectrode. The cell is filled with a selected solvent and electrolyte, for example any of the combinations described in the above identified articles. Typically useful combinations for a—Si include water; aqueous alkanols, particularly acetonitrile or lower alkanols such as methanol or ethanol as solvents and sodium hydroxide, sodium sulfate, or sodium chloride as the electrolyte. For the production of passivated PA electrodes, the electrolyte may be aqueous, e.g. aqueous polysulfide, sodium hydroxide, sodium sulfate, or sodium chloride.

Those skilled in the art will recognize that the solvent and electrolyte are not critical, and that any of a number of other solvent-electrolyte combinations may be employed.

The selected monomer will be in the electrolyte at a concentration of from about 0.01 to 0.5, although appreciable variation from this range can be tolerated without adverse effect.

The polymerization and deposition of polymer in the pinholes and pores is performed in the dark by the application of a selected voltage. The specific voltage will depend upon the monomer chosen. Usually a voltage of about 0.1 to 0.5 volts against the standard calomel electrode is sufficient.

Since the electrode coating is an insulator in the dark, the polymer film will deposit only on those areas of the substrate which are exposed to the electrolyte. The thickness of the deposited film is normally from 100 Angstroms to 1.0 micrometer.

The following non-limiting example is given by way of illustration only.

EXAMPLE 1

A cell was prepared comprising an electrode with an intrinsic amorphous silicon layer characterized by the presence of pinholes on a stainless steel substrate. The reference electrode was a saturated calomel electrode. The counter electrode was a Pt wire. The electrolyte was an aqueous solution which was 0.1 molar in tyramine and 0.3 molar in sodium hydroxide. It was swept in the dark from 0 to 1.6 volts versus the standard calomel electrode to precipitate the polymer film in the pinholes.

It was compared with a similar electrode which had not been protected with the polymer film by illumination with 100 milliwatt per cm$^2$ tungsten/halogen light using 0.5 molar aqueous solution of sulfuric acid which was 0.2 molar in ferric sulfate and 0.2M ferrous sulfate as the electrolyte. The open circuit voltage absorbed for the comparison cell was 700 millivolts. With the cell of the invention, the open circuit voltage was 870 millivolts.

I claim:

1. An electrode comprising a conductive substrate and a coating thereon having pinholes through it, said coating being a semiconductor when exposed to light and an insulator in the dark, said coating further being passivated by an insulating polymer deposited in said pinholes immediately adjacent to the substrate, to a thickness in the range of about 100 Angstroms to 1.0 micrometer by electro-chemical oxidation in the dark.

2. An electrode as in claim 1 wherein the coating comprises amorphous silicon or polyacetylene.

3. An electrode as in claim 1 where the insulating polymer is formed from a monomer selected from the group consisting of electrochemically oxidizable phenols and aromatic amines.

4. An electrode as in claim 3 wherein the electrochemically oxidizable phenol is 2,6-xylenol; 3,5-xylenol; o-hydroxybenzyl alcohol; m-hydroxybenzyl alcohol; o-hydroxyphenyl acetic acid; o-allylphenol; tyramine; or N(o-hydroxybenzyl) anidine.

5. An electrode as in claim 3 wherein the electrochemically oxidizable amine is p-toluidine; p-anisidine; p-aminobenzoic acid; 2-aminobenzotrifluoride; 3-aminobenzotrifluoride; p-phenylenediamine; or o-phenylenediamine.

6. An electrode as in claim 1 wherein the coating comprises amorphous silicon or polyacetylene and the insulating polymer is formed from a monomer selected from the group consisting of electrochemically oxidizable phenols and aromatic amines.

7. An electrode as in claim 6 wherein the electrochemically oxidizable phenol is 2,6-xylenol; 3,5-xylenol; o-hydroxybenzyl alcohol; m-hydroxybenzyl alcohol; o-hydroxyphenyl acetic acid; o-allylphenol; tyramine; or N(o-hydroxybenzyl) aniline.

8. An electrode as in claim 6 wherein the electrochemically oxidizable amine is p-toluidine; p-anisidine; p-aminobenzoic acid; 2-aminobenzotrifluoride; 3-aminobenzotrifluoride; p-phenylenediamine; or o-phenylenediamine.

9. An electrochemical photovoltaic cell including an electrode comprising a conductive substrate and a coating thereon having pinholes through it, said coating being a semiconductor when exposed to light and an insulator in the dark, said coating further being passivated by an insulating polymer deposited in said pinholes by electrochemical oxidation in the dark, and a transparent counterelectrode.

10. A photovoltaic cell as in claim 9 wherein the coating on the electrode comprises amorphous silicon or polyacetylene.

11. A photovoltaic cell as in claim 9 wherein the insulating polymer is formed from a monomer selected from the group consisting of electrochemically oxidizable phenols and aromatic amines.

12. A photovoltaic cell as in claim 11 wherein the electrochemically oxidizable phenol is 2,6-xylenol; 3,5-xylenol; o-hydroxybenzyl alcohol; m-hydroxybenzyl alcohol; o-hydroxyphenyl acetic acid; o-allylphenol; tyramine; or N(o-hydroxybenzyl) aniline.

13. A photovoltaic cell as in claim 11 wherein the electrochemically oxidizable amine is p-toluidine; p-anisidine; p-aminobenzoic acid; 2-aminobenzotrifluoride; 3-aminobenzotrifluoride; p-phenylenediamine; or o-phenylenediamine.

14. A method of passivating an electrode that comprises a conductive substrate with a coating thereon having pinholes through it, said coating being a semiconductor when exposed to light and an insulator in the dark, which method comprises providing an electrochemical cell including said electrode and an electrolyte containing a monomer which, when subjected to electrochemical oxidation in the dark, will form an insulating polymer, and subjecting said monomer to electrochemical oxidation in the dark, thereby to form said insulating polymer to a thickness in the range of about 100 Angstroms to 1.0 micrometer in said pinholes immediately adjacent to said substrate.

15. A method as in claim 14 wherein the coating comprises amorphous silicon or polyacetylene.

16. A method as in claim 14 wherein the insulating polymer is formed from a monomer selected from the group consisting of electrochemically oxidizable phenols and aromatic amines.

17. A method as in claim 16 wherein the electrochemically oxidizable phenol is 2,6-xylenol; 3,5-xylenol; o-hydroxybenzyl alcohol; m-hydroxybenzyl alcohol; o-hydroxyphenyl acetic acid; o-allylphenol; tyramine; or N(o-hydroxybenzyl) anidine.

18. A method as in claim 16 wherein the electrochemically oxidizable amine is p-toluidine; p-anisidine; p-aminobenzoic acid; 2-aminobenzotrifluoride; 3-aminobenzotrifluoride; p-phenylenediamine; or o-phenylenediamine.

* * * * *